US008471625B1

(12) United States Patent
Zhou et al.

(10) Patent No.: US 8,471,625 B1
(45) Date of Patent: Jun. 25, 2013

(54) BETA ENHANCED VOLTAGE REFERENCE CIRCUIT

(75) Inventors: Hao Zhou, Shanghai (CN); Bingkun Yao, Shanghai (CN); Tao Shui, Cupertino, CA (US); Yonghua Song, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 88 days.

(21) Appl. No.: 13/047,313

(22) Filed: Mar. 14, 2011

Related U.S. Application Data

(60) Provisional application No. 61/345,434, filed on May 17, 2010.

(51) Int. Cl.
*G05F 3/16* (2006.01)
*H02M 3/145* (2006.01)

(52) U.S. Cl.
USPC ............................ 327/539; 323/313; 323/314

(58) Field of Classification Search
None
See application file for complete search history.

(56) References Cited

U.S. PATENT DOCUMENTS

| | | | | |
|---|---|---|---|---|
| 5,838,175 | A * | 11/1998 | Hsieh | 327/94 |
| 6,465,996 | B2 * | 10/2002 | Nagata et al. | 323/303 |
| 7,053,572 | B2 * | 5/2006 | Yamamoto | 318/432 |
| 7,321,225 | B2 * | 1/2008 | Garlapati et al. | 323/313 |
| 7,453,252 | B1 * | 11/2008 | Megaw | 323/313 |
| 7,686,508 | B2 * | 3/2010 | Lin et al. | 374/178 |

* cited by examiner

*Primary Examiner* — Lincoln Donovan
*Assistant Examiner* — Terry L Englund

(57) ABSTRACT

A beta enhancement circuit includes a current source connected in series with a transistor between two voltage supply lines. In an embodiment, the voltage supply lines are configured for connection to a power source and ground potential. A resistor device is connected between a control terminal of the transistor device and one of voltage supply lines. A value for the resistor device is selected based on one or more process dependent parameters of the transistor.

10 Claims, 4 Drawing Sheets

BETA ENHANCED VOLTAGE REFERENCE CIRCUIT

CROSS REFERENCE TO RELATED APPLICATIONS

The present disclosure claims the benefit of priority from U.S. Provisional Application No. 61/345,434, filed May 17, 2010, the disclosure of which is incorporated herein by reference in its entirety for all purposes.

BACKGROUND

The present disclosure relates to voltage regulation and in particular to voltage reference circuitry having enhanced characteristics to variations in a beta parameter of the circuitry.

Unless otherwise indicated herein, the disclosure set forth in this section should not be construed as prior art to the claims in this application nor as admitted to be prior art by inclusion in this section.

Voltage reference sources are commonly used in integrated circuits. A bandgap voltage reference is a commonly used circuit block in analog designs which can provide a temperature independent and supply independent voltage reference. The voltage reference $V_{REF}$ in a bandgap circuit arises from two voltage components: $V_{BE}$ and $V_{PTAT}$. The voltage $V_{PTAT}$ is a voltage that is proportional to the absolute temperature (proportional to absolute temperature). Circuits for generating $V_{PTAT}$ are known. The $V_{PTAT}$ voltage has a positive temperature coefficient ($V_{PTAT}$ increases with temperature), while $V_{BE}$ has a negative temperature coefficient ($V_{BE}$ decreases with temperature). Consequently, the resulting bandgap voltage $V_{REF}$ can be made insensitive to variations in temperature when $V_{BE}$ and $V_{PTAT}$ are properly combined.

A typical configuration of a circuit that provides $V_{BE}$ is shown in FIG. 6, where for example a vertical bipolar junction transistor (BJT) PNP transistor device Q and a current source 602 are connected in series between a voltage supply terminal 612 that is connected to a voltage source $V_{DD}$ and another voltage supply terminal 614 that is connected to ground potential GND. The base emitter voltage $V_{BE}$, between the emitter terminal (E) of transistor Q and ground potential GND, is given by the relationship:

$$V_{BE} = \eta V_T \ln\frac{I_C}{I_S}, \qquad \text{Eqn. 1}$$

where η is a technology dependent parameter, $$V_T = \frac{kT}{q}$$

is commonly referred to as the thermal voltage, $I_C$ is collector current, and $I_S$ is saturation current.

The collector current $I_C$ is given by the relationship:

$$I_C = \left(1 - \frac{1}{\beta + 1}\right)I, \qquad \text{Eqn. 2}$$

where I is an emitter current of the transistor Q, which in this circuit is provided by the current source 602. The parameter β is referred to as the common-emitter current gain, and is heavily process dependent. During semiconductor processing, the process conditions for fabricating a given lot of wafers typically are not identical to the process conditions for a subsequent lot of wafers. In fact, wafers in the same wafer boat will vary. Consequently, the β parameters for devices will vary from wafer to wafer. Variations up to ±30% in the value of β for devices on different wafers are not uncommon.

For process technologies where β>>1 and for a given constant emitter current I from the current source 602 in a specific design, the collector current $I_C$ will remain approximately equal to emitter current I despite variations in β because the $$\frac{1}{\beta + 1}$$

term is small for large β's. However, for submicron processes (especially "deep" submicron processes such as 65 nM CMOS technology), β is small and may be on the order of β=1 or so. Consequently, devices from different wafers or different wafer lots may exhibit widely varying collector current $I_C$ characteristics due to its sensitivity to variations in β. Since $V_{BE}$ is a function of $I_C$, bandgap voltage reference circuits based on a submicron process may exhibit wide variations in their respective $V_{REF}$'s.

A common $V_{BE}$ circuit that addresses the small β problem is the series cascade design shown in FIG. 7. Here, two BJT devices $Q_1$, $Q_2$ are connected in series. The voltage $V_{BE}$ is taken from transistor $Q_1$ as shown in the figure. As can be appreciated, a base current $I_{B2}$ in $Q_2$ will compensate a base current $I_{B1}$ in $Q_1$. For the cascade circuit shown in FIG. 7, the collector current $I_{C1}$ that flows through transistor $Q_1$ is given by:

$$I_{C1} = I\left(1 - \frac{1}{(\beta + 1)^2}\right). \qquad \text{Eqn. 3}$$

Since the β term in Eqn. 3 is squared, variations in β will have only a secondary effect on the collector current $I_{C1}$ and so the sensitivity of $I_{C1}$ to process variations is reduced; in other words, $I_{C1} \approx I$. This in turn results in bandgap voltage reference circuits whose voltage references $V_{REF}$ are less sensitive to process variation.

It will be appreciated that the circuit of FIG. 7 requires $2V_{BE}$ headroom. Accordingly, in a voltage reference circuit that uses the circuit of FIG. 7 the headroom for the current source is computed as $V_{DD}$-$2V_{BE}$. Under common typical operating conditions, $V_{BE}$ may be on the order of 800 mV. Typically, $V_{DD}$ is 1.8 V and so the available voltage headroom for the current source is only about 0.2 V, which is generally insufficient for most designs of current sources and can impact the generation of accurate current flows.

SUMMARY

Disclosed embodiments of the present invention provide bandgap voltage reference circuits having enhanced β characteristics. In an embodiment, a beta enhancement circuit for a voltage reference comprises a current source connected in series with a transistor between first and second voltage supply terminals. A resistor device is connected between the control terminal of the transistor and the second voltage supply terminal. The first voltage supply terminal may be connected to a voltage source and the second voltage supply terminal connected to ground potential. A resistance value of the resistor device is determined based on one or more process dependent parameters of the transistor.

In an embodiment, a beta enhancement circuit comprises a two stage configuration of transistor circuits. In a first stage, a first current source and a first transistor are connected in series fashion between a voltage supply terminal and a ground potential terminal. A resistor device is connected between a control terminal of the first transistor and the ground potential terminal. A resistance value of the resistor device is determined based on one or more process dependent parameters of the first transistor. In a second stage, a second current source and a second transistor are connected in series fashion between the voltage supply terminal and the ground potential terminal. The second transistor is further connected in cascade fashion to the first transistor.

A third stage may be added, comprising a third current source and a third transistor device connected in series between the voltage supply terminal and the ground potential terminal. The third transistor is further connected in cascade fashion to the second transistor.

The following detailed description and accompanying drawings provide a more detailed understanding of the nature and advantages of the disclosed embodiments.

DETAILED DESCRIPTION

In the following description, for purposes of explanation, numerous examples and specific details are set forth in order to provide a thorough understanding of aspects and features of the present invention. It will be evident, however, to one skilled in the art that the present invention as defined by the claims may include some or all of the features in these examples alone or in combination with other features described below, and may further include modifications and equivalents of the features and concepts described herein.

Figure 1:
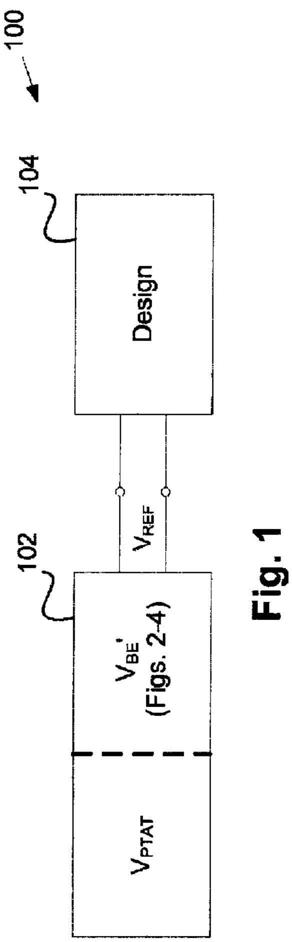
FIG. 1 illustrates a generic example of circuitry that employs a beta enhancement circuit in accordance with the present invention.

FIG. 1 represents a generalized example of circuitry 100 that includes a beta enhancement circuit in accordance with aspects of the present invention. In an embodiment, the circuitry 100 may represent the blocks of an integrated circuit (IC). A voltage reference block 102 in accordance with aspects of the present invention can provide a temperature independent voltage reference level $V_{REF}$ to the design block 104 of the IC. The design block 104 may comprise analog circuitry, digital circuitry, or a combination of analog and digital circuitry. The voltage reference block 102 includes a $V_{PTAT}$ circuit for generating a $V_{PTAT}$ voltage and a $V_{BE}$ (beta enhancement) circuit for generating a $V_{BE}$ voltage.

Figure 2:
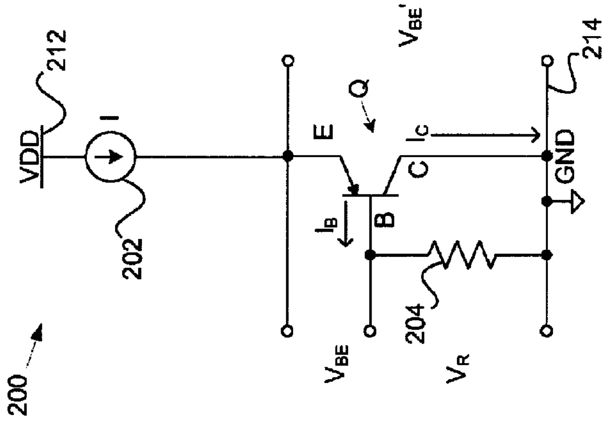
FIGS. 2-4 illustrate examples of $V_{BE}$ circuits according to disclosed embodiments of the present invention.

FIG. 2 shows an embodiment of a $V_{BE}$ circuit 200 in accordance with aspects of the present invention. In embodiments, the $V_{BE}$ circuit 200 can be incorporated in a bandgap voltage reference circuit.

The $V_{BE}$ circuit 200 includes a current source 202 connected to a first voltage supply terminal 212. The first voltage supply terminal 212 may be configured for connection to provide a first voltage potential. For example, FIG. 2 shows the first voltage supply terminal 212 connected to a power source $V_{DD}$ to supply the first voltage potential, which for most IC designs is typically on the order of 1.8 V. A transistor device Q is connected between the current source 202 and a second voltage supply terminal 214. The second voltage supply terminal 214 may be configured for connection to provide a second voltage potential. For example, the figure shows the second voltage supply terminal 214 connected to ground potential GND.

In an embodiment, the transistor Q is a vertical bipolar junction transistor (vertical BJT), and in particular is a PNP vertical BJT. An emitter terminal (E) of the transistor Q is connected to the current source 202, while a collector terminal (C) of the transistor is connected to the second voltage supply terminal 214. A resistor device 204 is connected between a base terminal (B) of the transistor Q (referred to herein more generally as the "control terminal") and the second voltage supply terminal 214.

During operation, an emitter current I, equal to the current from the current source 202, flows to transistor Q. In embodiments, the $V_{BE}$ circuit 200 outputs a compound voltage $V_{BE}'$ that is the sum of the following voltages which arise in transistor Q: base emitter voltage $V_{BE}$ and a voltage drop $V_R$ across resistor device 204. Thus, $$V_{BE}'=V_{BE}+V_R. \qquad \text{Eqn. 4}$$

The voltage drop $V_R$ is given by:

$$V_R = I_B R \qquad \text{Eqn. 5a}$$

$$= IR\frac{1}{\beta+1}, \qquad \text{Eqn. 5b}$$

where a base current $I_B$ in transistor Q is related to the emitter current by $$I\frac{1}{\beta+1}.$$

The base emitter voltage $V_{BE}$, given by Eqn. 1, will now be examined in more detail as follows:

$$V_{BE} = \eta V_T \ln\frac{I_C}{I_S} \qquad \text{Eqn. 6a}$$

$$= \eta V_T \ln\frac{\left(1-\frac{1}{\beta+1}\right)I}{I_S} \qquad \text{Eqn. 6b}$$

$$= \eta V_T \ln\frac{I}{I_S} + \eta V_T \ln\left(1-\frac{1}{\beta+1}\right). \qquad \text{Eqn. 6c}$$

Using the Taylor expansion series, we obtain the following expansion of the natural logarithm in the second term of Eqn. 6c:

$$\ln\left(1-\frac{1}{\beta+1}\right) = -\frac{1}{\beta+1} - \frac{1}{2}\frac{1}{(\beta+1)^2} - \frac{1}{3}\frac{1}{(\beta+1)^3} - \frac{1}{4}\frac{1}{(\beta+1)^4} - \dots . \qquad \text{Eqn. 7}$$

Substituting Eqns. 5b, 6c, and 7 into Eqn. 4 and re-arranging terms, we obtain:

$$V_{BE}' = \eta V_T \ln\frac{I}{I_S} - \frac{1}{\beta+1}(\eta V_T - IR) - \eta V_T\left(\frac{1}{2}\frac{1}{(\beta+1)^2} - \frac{1}{3}\frac{1}{(\beta+1)^3} - \frac{1}{4}\frac{1}{(\beta+1)^4} - \dots\right). \quad \text{Eqn. 8}$$

The resistance value of resistor device 204 is designated by R. For a given operating current I of the current source 202, it can be seen from Eqn. 8 that by properly choosing a resistance value R for the resistor device 204, it is possible to cancel out the first order term $$\frac{1}{\beta+1}(\eta V_T - IR)$$

in the equation to a large degree. The compound voltage $V_{BE}'$ therefore becomes a function largely of only of the high order terms of β, which are generally much smaller than the first order term and so $V_{BE}'$ becomes less sensitive to process variations in β. Accordingly, a bandgap voltage reference circuit that employs a $V_{BE}$ circuit in accordance with the present invention will likewise produce a reference voltage that is less sensitive to process variations in β.

Figure 5:
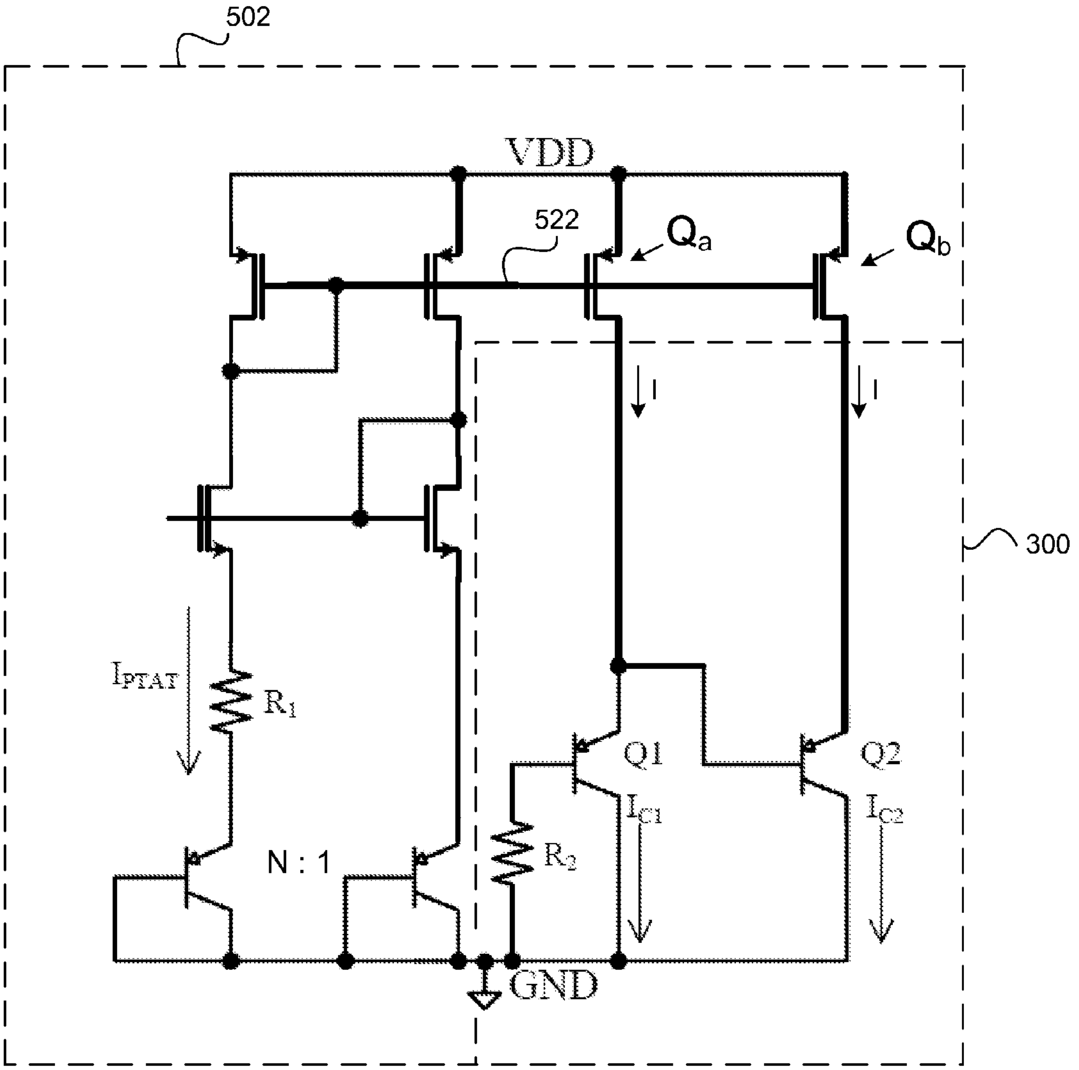
FIG. 5 shows an example of PTAT bias current generation circuit.
Figure 7:
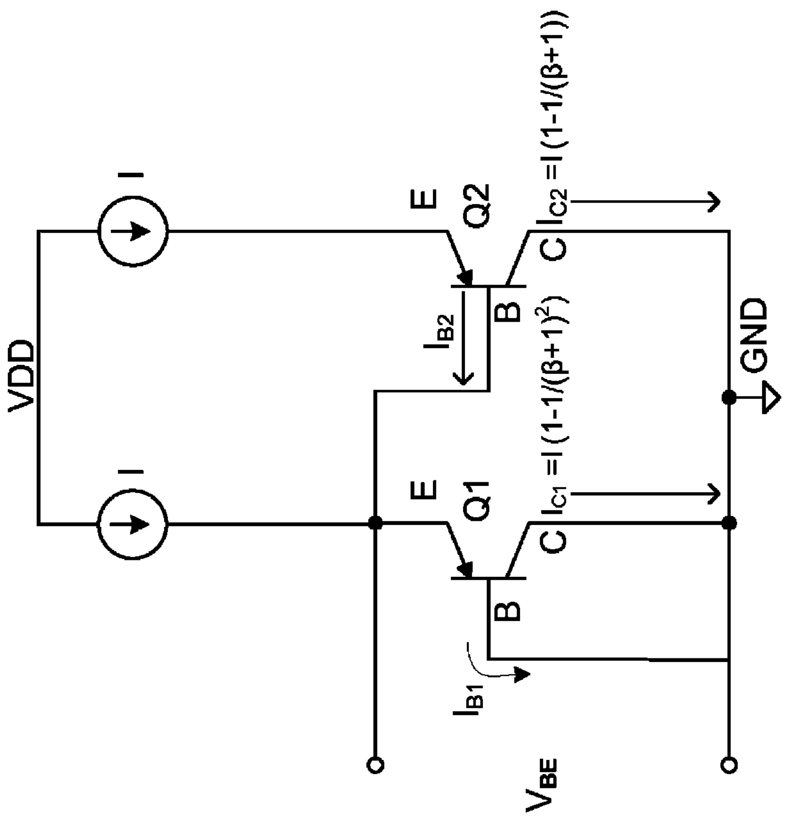
Fig. 7 (prior art)
FIGS. 6 and 7 illustrate conventional $V_{BE}$ circuit designs.
Figure 6:
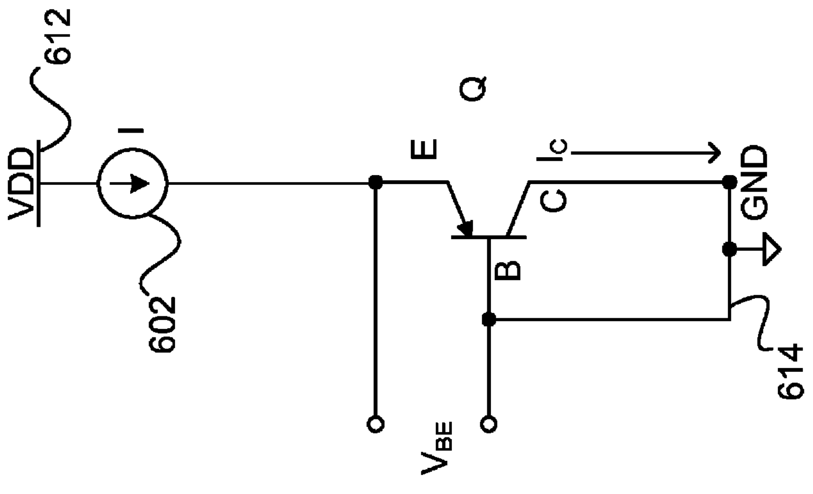
Fig. 6 (prior art)

In an embodiment, a PTAT current source is used in the beta enhancement circuit shown in FIG. 5. Accordingly, the current I is computed as:

$$I = \frac{\eta V_T}{R_1},$$

and so the second term in Eqn. 8 becomes $$\frac{1}{\beta+1}\left(\eta V_T - \frac{\eta V_T}{R_1}R_2\right),$$

which can be expressed as $$\frac{\eta V_T}{\beta+1}\left(1 - \frac{R_2}{R_1}\right).$$

Thus, $R_1$ and $R_2$ can be selected to achieve a ratio close to 1 with the effect of substantially canceling out the second term in Eqn. 8 to reduce in large measure first order errors introduced by variations in β.

For example, a circuit simulation may be run to minimize variations in $V_{REF}$ for the range $0.5 \leqq \beta \leqq 1.5$. The following circuit simulation may be set up for the circuit 200 in FIG. 2. Let $$x = \left(\frac{1}{\beta+1}\right).$$

For the circuit 200, define:

$$\begin{cases} f_1(x, IR) = \eta V_T \ln(1-x) + IRx \\ x \in \left[\frac{2}{5}, \frac{2}{3}\right] \end{cases}.$$

When $x = x_{01}$, $f_1(x, IR)$ has its extremum defined as:

$$\frac{\partial f_1(x, IR)}{\partial x} = -\eta V_T \frac{1}{1-x} + IR = 0 \Longrightarrow x_{01} = 1 - \frac{\eta V_T}{IR},$$

then the extremum of $f_1$ is:

$$f_1(x_{01}, IR) = \eta V_T \ln\frac{\eta V_T}{IR} + (IR - \eta V_T),$$

and the two ports of $f_1$ are:

$$f_1\left(\frac{2}{5}, IR\right) = \eta V_T \ln\frac{3}{5} + \frac{2}{5}IR \quad \text{and} \quad \text{Eqn. A}$$

$$f_1\left(\frac{2}{3}, IR\right) = \eta V_T \ln\frac{1}{3} + \frac{2}{3}IR \quad \text{Eqn. B}$$

We deem that the variation of $f_1$ is minimal when $$f_1\left(\frac{2}{5}, IR\right) = f_1\left(\frac{2}{3}, IR\right). \quad \text{Eqn. C}$$

Substituting Eqns. A and B into Eqn. C yields $IR \approx 2.21\eta V_T$. The resulting variation can be computed as the following:

$$\left|f_1\left(\frac{2}{3}, 2.21\eta V_T\right) - f_1\left(\frac{2}{5}, 2.21\eta V_T\right)\right| \approx 0.156\eta V_T.$$

The foregoing described embodiment provides an elegant solution to address the problem encountered with variations in β due to process variations. By the proper placement of a resistor and selection of a resistance value for the resistor, first order errors introduced by variations in β can be reduced in large measure.

Figure 3:
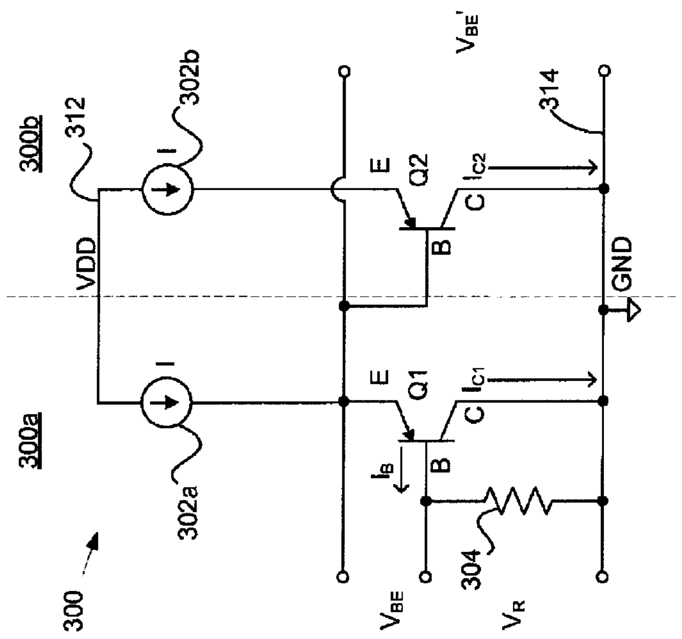

The circuit shown in FIG. 2 can be enhanced by cascading it with a second stage. The circuit shown in FIG. 3 represents an embodiment of a two-stage $V_{BE}$ circuit 300 in accordance with aspects of the present invention. A first stage 300*a* comprises a circuit similar to the circuitry shown in FIG. 2. A series-connected first current source 302*a* and first transistor $Q_1$ are connected between first and second voltage supply terminals 312, 314. In an embodiment, the first current source 302*a* is connected between the first voltage supply terminal 312 and an emitter terminal (E) of the first transistor $Q_1$. A collector terminal (C) of the first transistor $Q_1$ is connected to the second voltage supply terminal 314. The first transistor $Q_1$, for example, may be a vertical PNP BJT.

A resistor device 304 is connected between a control terminal (B) of transistor $Q_1$ and the second voltage supply terminal 314. The first voltage supply terminal 312 may be configured for connection to a power source (e.g., $V_{DD}$) to provide a first voltage potential. The second voltage supply terminal 314 may be connected to ground potential GND.

A second stage 300*b* is connected in cascade fashion with the first stage 300*a*. The second stage 300*b* includes a second current source 302*b* connected in series with a second transistor $Q_2$. This series-connected pair in turn is connected between the first and second voltage supply terminals 312, 314. In an embodiment, the series-connected second current source 302*b* and second transistor $Q_2$ may be connected between different voltage supply terminals, so long as the second current source 302*b* can source the same amount of current through second transistor $Q_2$ as sourced through first transistor $Q_1$. Continuing with FIG. 3, the second current source 302*b* is connected between the first voltage supply terminal 312 and an emitter terminal (E) of the second transistor $Q_2$. A collector terminal (C) of the second transistor $Q_2$ is connected to the second voltage supply terminal 314. The second stage 300*b* is cascaded with the first stage 300*a* by a connection of a control terminal (B) of the second transistor $Q_2$ to the emitter terminal (E) of the first transistor $Q_1$. The second transistor $Q_2$, for example, may be a vertical PNP BJT.

During operation, the first and second current sources 302*a*, 302*b* each source an amount of current I through the emitters of the first and second transistors $Q_1$, $Q_2$ respectively. In embodiments, the same amount of current should be sourced through transistors $Q_1$, $Q_2$. Accordingly, an emitter current through each transistor $Q_1$, $Q_2$ is equal to I. A compound voltage $V_{BE}'$ of the $V_{BE}$ circuit 300 arises from a base emitter voltage drop $V_{BE}$ developed in the first transistor $Q_1$ and a voltage drop $V_R$ developed across the resistor device 304 during operation of the circuit. In embodiments, the first and second current sources 302*a*, 302*b* can be separate circuits that each provide a current I. In other embodiments, the first and second current sources 302*a*, 302*b* may be outputs from a single circuit that each provide current I.

For the circuit shown in FIG. 3, the collector current term ($I_{C1}$) in the base emitter voltage $V_{BE}$ equation (see for example Eqns. 1 or 6a), is given by Eqn. 3. The base emitter voltage $V_{BE}$ in the first transistor $Q_1$ of the circuit in FIG. 3 is therefore:

$$V_{BE} = \eta V_T \ln\frac{\left(1-\frac{1}{(\beta+1)^2}\right)I}{I_S} \qquad \text{Eqn. 9a}$$

$$= \eta V_T \ln\frac{I}{I_S} + \eta V_T \ln\left(1-\frac{1}{(\beta+1)^2}\right). \qquad \text{Eqn. 9b}$$

Using the Taylor expansion series, we obtain the following expansion of the natural logarithm in the second term of Eqn. 9b:

$$\ln\left(1-\frac{1}{(\beta+1)^2}\right) = -\frac{1}{(\beta+1)^2} - \frac{1}{2}\frac{1}{(\beta+1)^4} - \frac{1}{3}\frac{1}{(\beta+1)^6} - \frac{1}{4}\frac{1}{(\beta+1)^8} - \cdots . \qquad \text{(Eqn. 10)}$$

The voltage drop $V_R$ across resistor device 304 is given by Eqn. 5a, where the base current $I_B$ of the first transistor $Q_1$ in the circuit of FIG. 3 is given by:

$$I_B = I\left(\frac{1}{\beta+1} + \frac{1}{(\beta+1)^2}\right), \qquad \text{Eqn. 11}$$

where the emitter current is I. The voltage drop $V_R$ is therefore:

$$V_R = IR\left(\frac{1}{\beta+1} + \frac{1}{(\beta+1)^2}\right), \qquad \text{Eqn. 12}$$

Recalling that Eqn. 4 above describes compound voltage $V_{BE}'$ as:

$$V_{BE}' = V_{BE} + V_R,$$

we can substitute Eqns. 9b and 10 for $V_{BE}$ and Eqn. 12 for $V_R$ to obtain:

$$V_{BE}' = \eta V_T \ln\frac{I}{I_S} - \frac{1}{(\beta+1)^2}(\eta V_T - IR) - \frac{1}{\beta+1}IR - \eta V_T\left(\frac{1}{2}\frac{1}{(\beta+1)^4} + \frac{1}{3}\frac{1}{(\beta+1)^6} + \cdots\right). \qquad \text{Eqn. 13}$$

As can be seen from Eqn. 13, the resistor value R for resistor device 304 can be selected so that the factor ($\eta V_T$-IR) becomes close to zero. The term $\eta V_T$ can be determined during the circuit design and circuit simulation stage. Parameters for modeling the circuit for circuit simulation may be obtained from process data. Accordingly, if the resistor value R is selected to match $\eta V_T$, the second term may essentially drop out of the equation. Though the third term is first order in β, the fourth term is a subtractive term. So for a range of β's, the third and fourth terms may cancel each other out to a certain degree. Thus, the $V_{BE}$ circuit 300 can still provide good compensation for variations in β since the majority of the error can be cancelled out, and so a reduction in variations in the compound voltage $V_{BE}'$, and ultimately $V_{REF}$, can be realized.

Figure 4:
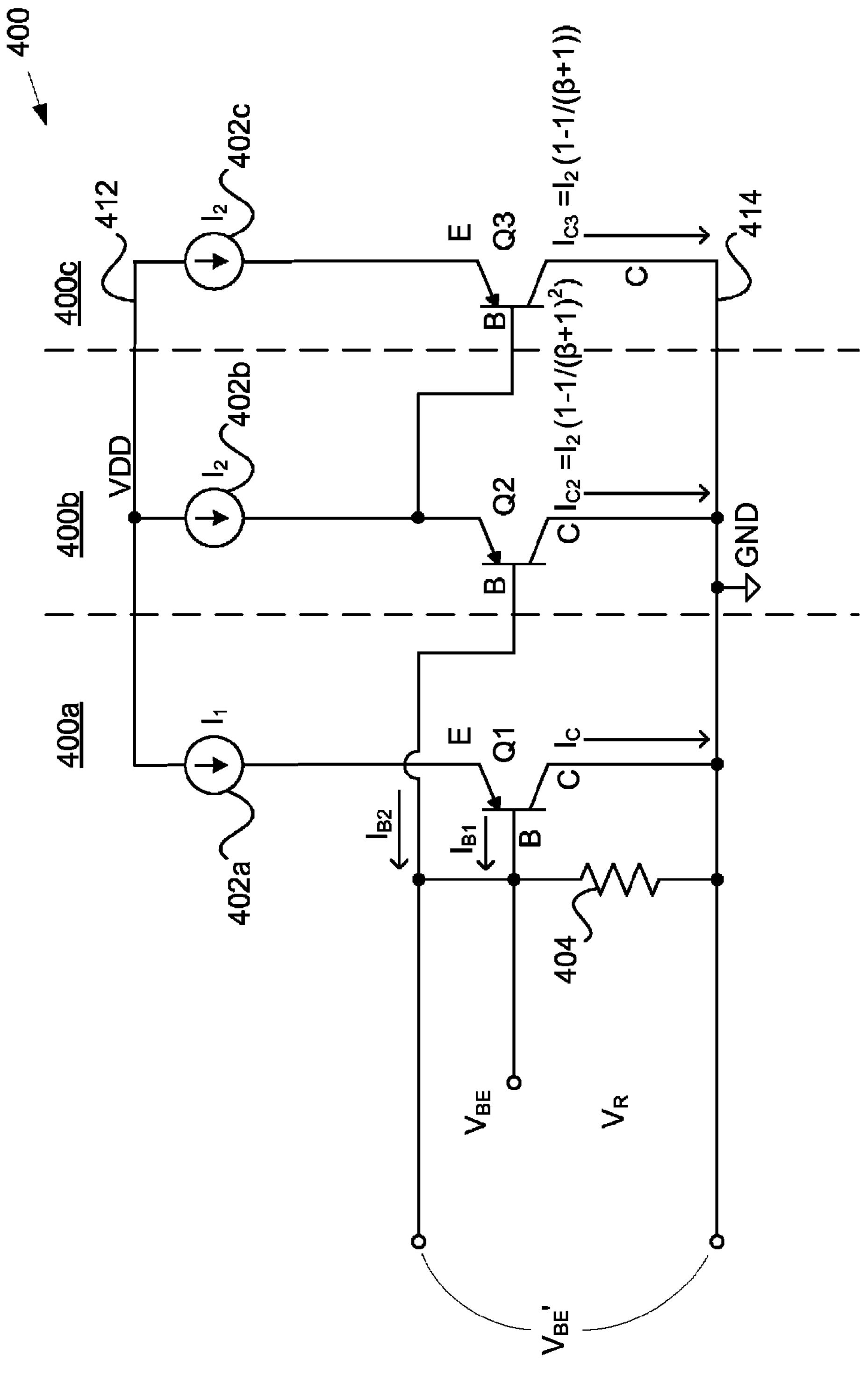

FIG. 4 shows an embodiment of a three-stage $V_{BE}$ circuit 400 in accordance with aspects of the present invention. A first stage 400*a* comprises a circuit similar to the first stage 300*a* shown in FIG. 3. The first stage 400*a* includes a first current source 402*a* connected to a first voltage supply terminal 412. The first current source 402*a* is further connected to an emitter terminal (E) of a first transistor $Q_1$. A collector terminal (C) of the first transistor $Q_1$ is connected to a second voltage supply terminal 414. A resistor device 404 is connected between a control terminal (B) of the first transistor $Q_1$ and the second voltage supply terminal 414.

The first transistor $Q_1$ may be a vertical PNP BJT. In embodiments, the first voltage supply terminal 412 can be configured for connection to a power supply (e.g., $V_{DD}$) and the second voltage supply terminal 414 can be configured for connection to ground potential GND.

A second stage 400*b* includes a second current source 402*b* connected to the first voltage supply terminal 412 and connected to an emitter terminal (E) of a second transistor $Q_2$. The first current source 402*a* sources a current $I_1$. A collector terminal (C) of the second transistor $Q_2$ is connected to the second voltage supply terminal 414. The second stage 400*b* is cascaded with the first stage 400*a* by the connection of a control terminal (B) of the second transistor $Q_2$ to the control terminal (B) of the first transistor $Q_1$. In an embodiment, the second transistor $Q_2$ may be a vertical PNP BJT.

A third stage 400$c$ includes a third current source 402$c$ connected to the first voltage supply terminal 412 and connected to an emitter terminal (E) of a third transistor $Q_3$. In an embodiment, the second and third current sources 402$b$, 402$c$ source the same current $I_2$. A collector terminal (C) of the third transistor $Q_3$ is connected to the second voltage supply terminal 414. The third stage 400$c$ is cascaded with the second stage 400$b$ by the connection of a control terminal (B) of the third transistor $Q_3$ to the emitter terminal (E) of the second transistor $Q_2$. In an embodiment, the third transistor $Q_3$ may be a vertical PNP BJT.

A compound voltage $V_{BE}'$ of the $V_{BE}$ circuit 400 arises from a base emitter voltage drop $V_{BE}$ developed in the first transistor $Q_1$ and a voltage drop $V_R$ developed across the resistor device 404 during operation of the circuit.

For the circuit 400 shown in FIG. 4, the base emitter voltage $V_{BE}$ in the first transistor $Q_1$ is given by:

$$V_{BE} = \eta V_T \ln\frac{\left(1-\frac{1}{\beta+1}\right)I_1}{I_S} \quad \text{Eqn. 14a}$$

$$= \eta V_T \ln\frac{I_1}{I_S} + \eta V_T \ln\left(1-\frac{1}{\beta+1}\right). \quad \text{Eqn. 14b}$$

Using the Taylor expansion series, we obtain the following expansion of the natural logarithm in the second term of Eqn. 14b:

$$\ln\left(1-\frac{1}{\beta+1}\right) = -\frac{1}{\beta+1} - \frac{1}{2}\frac{1}{(\beta+1)^2} - \frac{1}{3}\frac{1}{(\beta+1)^3} - \frac{1}{4}\frac{1}{(\beta+1)^4} - \cdots . \quad \text{Eqn. 15}$$

The voltage drop $V_R$ is given by:

$$V_R = (I_{B1} + I_{B2})R \quad \text{Eqn. 16a}$$

$$= \frac{I_1 R}{\beta+1} + \frac{I_2 R}{\beta+1} + \frac{I_2 R}{(\beta+1)^2}. \quad \text{Eqn. 16b}$$

Using Eqns. 4, 14b, 15, and 16b, the compound voltage $V_{BE}'$ is given as:

$$V_{BE}' = V_{BE} + V_R \quad \text{Eqn. 17a}$$

$$= \eta V_T \ln\frac{I_1}{I_S} - \frac{1}{\beta+1}(\eta V_T - I_1 R - I_2 R) - \frac{1}{(\beta+1)^2}\left(\frac{1}{2}\eta V_T - I_2 R\right) - \eta V_T\left(\frac{1}{3}\frac{1}{(\beta+1)^3} + \frac{1}{4}\frac{1}{(\beta+1)^4} + \cdots\right). \quad \text{Eqn. 17b}$$

For the three-stage embodiment shown in FIG. 4, the second and third terms in Eqn. 17b can be canceled by properly selecting the resistor value R and adjusting the currents $I_1$ and $I_2$. For example, the following conditions can be used to determine values for R, $I_1$, and $I_2$:

$$\eta V_T = I_1 R + I_2 R \quad \text{Condition 1}$$

$$\frac{1}{2}\eta V_T = I_2 R \quad \text{Condition 2}$$

$$I_1 = I_2 \quad \text{Condition 3}$$

FIG. 5 illustrates an example of a typical current source that can be used in embodiments of the present invention. The figure shows an example of a PTAT (proportional to absolute temperature) current source 502 comprising transistors $Q_a$ and $Q_b$ for driving the circuitry 300 shown in FIG. 3. Current I is sourced through the transistors $Q_a$ and $Q_b$ to transistors $Q_1$ and $Q_2$ respectively. A common control terminal 522 carries a control signal that is generated by the rest of the circuitry comprising the current source 502 to control the current I.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A beta enhancement circuit comprising:

a first voltage supply terminal for connection to a power supply;

a second voltage supply terminal for connection to ground potential;

a first stage;

a second stage; and a third stage;

wherein the first stage comprises a first current source connected to the first voltage supply terminal, a first transistor connected between the first current source and the second voltage supply terminal, and a resistor connected between a control terminal of the first transistor and the second voltage supply terminal, wherein the second stage comprises a second current source connected to a third voltage supply terminal, and a second transistor cascade connected to the first transistor, the second transistor having a first terminal connected to the second current source and a second terminal connected to a fourth voltage supply terminal, wherein the third stage comprises a third current source connected to the third voltage supply terminal, and a third transistor connected between the third current source and the second voltage supply terminal, wherein a control terminal of the third transistor is connected to the first terminal of the second transistor, and wherein a reference voltage is based at least on an output voltage provided as a voltage potential at an electrical connection between i) the first current source, and ii) the first transistor referenced to the second voltage supply terminal.

2. The circuit of claim 1 wherein the first current source provides the same amount of current as the second current source.

3. The circuit of claim 1 wherein the third voltage supply terminal is the same as the first voltage supply terminal.

4. The circuit of claim 1 wherein the resistance value of the resistor is proportional to one or more process dependent parameters of the first transistor.

5. The circuit of claim 4 wherein the resistance value of the resistor is proportional to $\eta V_T$, where $\eta$ is a process dependent parameter and $V_T$ is thermal voltage.

6. The circuit of claim 1 wherein the first transistor comprises i) a first terminal connected to the first current source, and ii) a second terminal connected to the second voltage supply terminal.

7. The circuit of claim 6 wherein a control terminal of the second transistor is connected to the control terminal of the first transistor.

8. The circuit of claim 1 wherein the electrical connection, between the first current source and the first transistor referenced to the second voltage supply terminal, is connected to a second other circuit to provide the reference voltage to be input by the second other circuit.

9. The circuit of claim 1 wherein the first current source, the second current source, and the third current source provide the same amount of current.

10. The circuit of claim 1 wherein the second voltage supply terminal is shorted to the fourth voltage supply terminal.

* * * * *